(12) United States Patent
Jong et al.

(10) Patent No.: US 7,130,340 B1
(45) Date of Patent: Oct. 31, 2006

(54) NOISE MARGIN SELF-DIAGNOSTIC RECEIVER LOGIC

(75) Inventors: Jyh-Ming Jong, Saratoga, CA (US); Leo Yuan, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 704 days.

(21) Appl. No.: 09/698,622

(22) Filed: Oct. 27, 2000

(51) Int. Cl.
*H04B 3/46* (2006.01)

(52) U.S. Cl. ..................................... 375/227

(58) Field of Classification Search .............. 375/224, 375/226, 228, 227, 294, 286, 371, 372, 373, 375/375, 376, 215, 327, 355; 327/147, 156, 327/20, 74–76, 374–377, 205, 57; 324/96; 73/12.01
See application file for complete search history.

(56) References Cited

U.S. PATENT DOCUMENTS

| | | | | |
|---|---|---|---|---|
| 4,924,483 A | * | 5/1990 | Cho ............................... 377/3 |
| 4,933,959 A | * | 6/1990 | Knechtel ..................... 375/376 |
| 5,065,413 A | * | 11/1991 | Fukuda ........................ 375/376 |
| 5,097,147 A | * | 3/1992 | Stuebing et al. ............... 327/74 |
| 5,268,635 A | * | 12/1993 | Bortolini et al. ............... 324/96 |
| 5,295,132 A | * | 3/1994 | Hashimoto et al. ......... 370/242 |
| 5,455,720 A | * | 10/1995 | Norton, Jr. .................... 360/46 |
| 5,498,985 A | * | 3/1996 | Parle et al. .................... 327/74 |
| 5,539,340 A | * | 7/1996 | Van Leeuwen et al. ....... 327/74 |
| 5,623,220 A | * | 4/1997 | Betti et al. ..................... 327/79 |
| 5,729,208 A | * | 3/1998 | Ogiwara ...................... 340/635 |
| 5,790,613 A | * | 8/1998 | Tateishi ....................... 375/376 |
| 5,814,903 A | * | 9/1998 | Wu .............................. 307/125 |
| 5,825,431 A | * | 10/1998 | Walker ........................ 348/536 |
| 5,909,414 A | * | 6/1999 | Ohta ........................ 369/44.33 |
| 5,923,191 A | * | 7/1999 | Nemetz et al. ................ 327/20 |
| 6,084,607 A | * | 7/2000 | Matsuda ....................... 347/19 |
| 6,108,808 A | * | 8/2000 | Dent ........................... 714/736 |
| 6,111,443 A | * | 8/2000 | Mores et al. ................ 327/206 |
| 6,154,548 A | * | 11/2000 | Bizzan ....................... 381/94.5 |
| 6,188,829 B1 | * | 2/2001 | Kato et al. .................... 386/46 |
| 6,194,933 B1 | * | 2/2001 | Ishino et al. ................ 327/163 |
| 6,275,074 B1 | * | 8/2001 | Hastings ....................... 327/74 |
| 6,400,658 B1 | * | 6/2002 | Yang et al. ............... 369/30.25 |
| 6,404,242 B1 | * | 6/2002 | Draxelmayr ................. 327/76 |
| 6,404,976 B1 | * | 6/2002 | Kondoh ....................... 386/46 |
| 6,412,332 B1 | * | 7/2002 | Bartonek ................... 73/12.01 |
| 6,421,801 B1 | * | 7/2002 | Maddux et al. ............. 714/744 |
| 6,791,370 B1 | * | 9/2004 | Morzano ...................... 327/57 |

* cited by examiner

*Primary Examiner*—Emmanuel Bayard
(74) *Attorney, Agent, or Firm*—Osha Liang LLP

(57) ABSTRACT

A noise margin self-diagnostic receiver circuit has been developed. The self-diagnostic circuit includes one comparator for comparing the signal voltage to a high reference voltage, a second comparator for comparing the signal voltage to a low reference voltage, and a logic circuit that activates an alarm if a noise error is detected. The circuit analyzes the data from the comparators and determines if a noise error has occurred dependent on being clocked by one or both of an output from the comparator comparing the signal voltage to the high reference voltage and an output from the comparator comparing the signal voltage to the low reference voltage.

13 Claims, 2 Drawing Sheets

NOISE MARGIN SELF-DIAGNOSTIC RECEIVER LOGIC

BACKGROUND

In digital signaling, the voltage swing of the signal often encounters significant noise. This is especially the case with low voltage signals at a high speed interface. In such applications, problems such as power noise or ground noise can be the result of simultaneous switching of input/output (I/O) buffers, signal reflections, or signal cross-talk. Noise can also result from a weakened physical interconnection caused by a bad solder joint, an improper connection, etc. The result of such noise is the reduction of signal voltage margin as well as degradation of signal performance and reliability.

FIG. 1A shows a graphical depiction of an example of an ideal signal 10. The graph represents the voltage of the signal as depicted over time. VREF represents the mid-point reference of the voltage. VREF_L represents the lower voltage boundary. Any signal voltage level below this point, is considered a LOW signal value. VREF_H represents the high voltage boundary. Any signal voltage level above this point is considered a HIGH signal value.

In FIG. 1A, the signal 10 starts LOW and transitions to HIGH before returning to LOW. The signal 10 clearly and unambiguously makes the successful transition in signal value. However, FIG. 1B shows the effect on the signal 20 of noise caused by a ground glitch. The signal 20 never clearly makes the transition from LOW to HIGH. Instead, it is stuck in the transitional area between VREF_L and VREF_H. FIG. 1C shows the effect on the signal 30 of noise caused by a power glitch. The signal 30 never clearly makes the transition from HIGH to LOW. As with the ground glitch of FIG. 1B, the signal is stuck in the same transitional area without a clear, discernable value. Finally, FIG. 1D shows an example of the effect of a high resistance path. The signal 40 never crosses VREF_L during its transition from HIGH to LOW. As seen in the previous examples, its value it indeterminate.

In general, electrical characterization of noise related problems require proper software support in generating data patterns and robust hardware support to determine the transient voltage. A common method of debugging a system involves pin by pin testing to find signal voltage errors. This is a very costly and time-consuming operation whether in the laboratory, in the production facility, or in the field.

SUMMARY OF INVENTION

In some aspects the invention relates to an apparatus for detecting a noise error of a signal comprising: a high comparator that references a high voltage limit with the signal and generates an output; a low comparator that references a low voltage limit with the signal and generates an output; and a circuit that processes the high comparator output and the low comparator output, wherein the circuit generates an alarm if a noise error is detected.

In an alternative embodiment, the invention relates to an apparatus for detecting a noise error of a signal comprising: means for detecting a high voltage noise error; means for detecting a low voltage noise error; and means for activating an alarm signal upon detection of the high voltage or the low voltage noise error.

In an alternative embodiment, the invention relates to a method for detecting a noise error of a signal comprising: comparing a high signal voltage with a high reference voltage; activating an alarm if the high signal voltage is less than the high reference voltage; comparing a low signal voltage with a low reference voltage; and activating an alarm if the low signal voltage is greater than the low reference voltage.

The advantages of the invention include, at least, the ability of a digital circuit to perform a self-diagnosis of signal noise error without pin-by-pin or other time intensive debugging methods. Another advantage of the disclosed invention includes the ability for the circuit to perform self-diagnosis of signal noise error in the test lab, at production quality control, or during actual usage.

DETAILED DESCRIPTION OF THE INVENTION

Figure 1A:
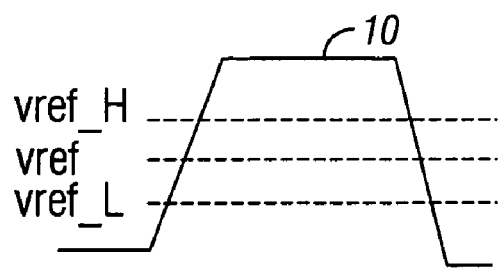
FIG. 1A shows a graph of an ideal signal voltage.
Figure 1B:
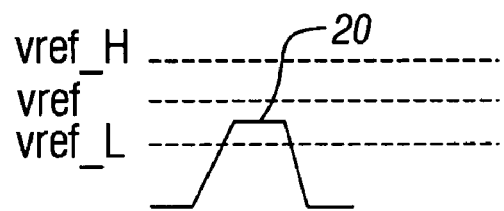
FIG. 1B shows a graph of a signal voltage affected by ground glitch noise.
Figure 1C:
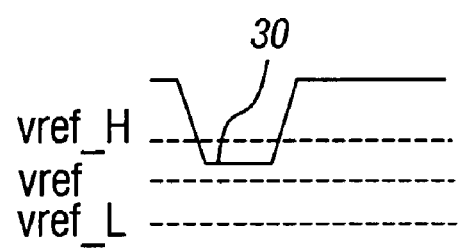
FIG. 1C shows a graph of a signal voltage affected by power glitch noise.
Figure 1D:
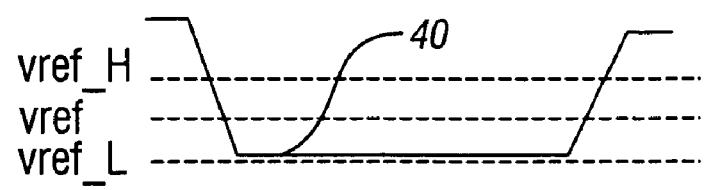
FIG. 1D shows a graph of a signal voltage affected by high resistance of the signal path.

Exemplary embodiments of the invention will be described with reference to the accompanying drawings. Like items in the drawings are shown with the same reference numbers.

Figure 2:
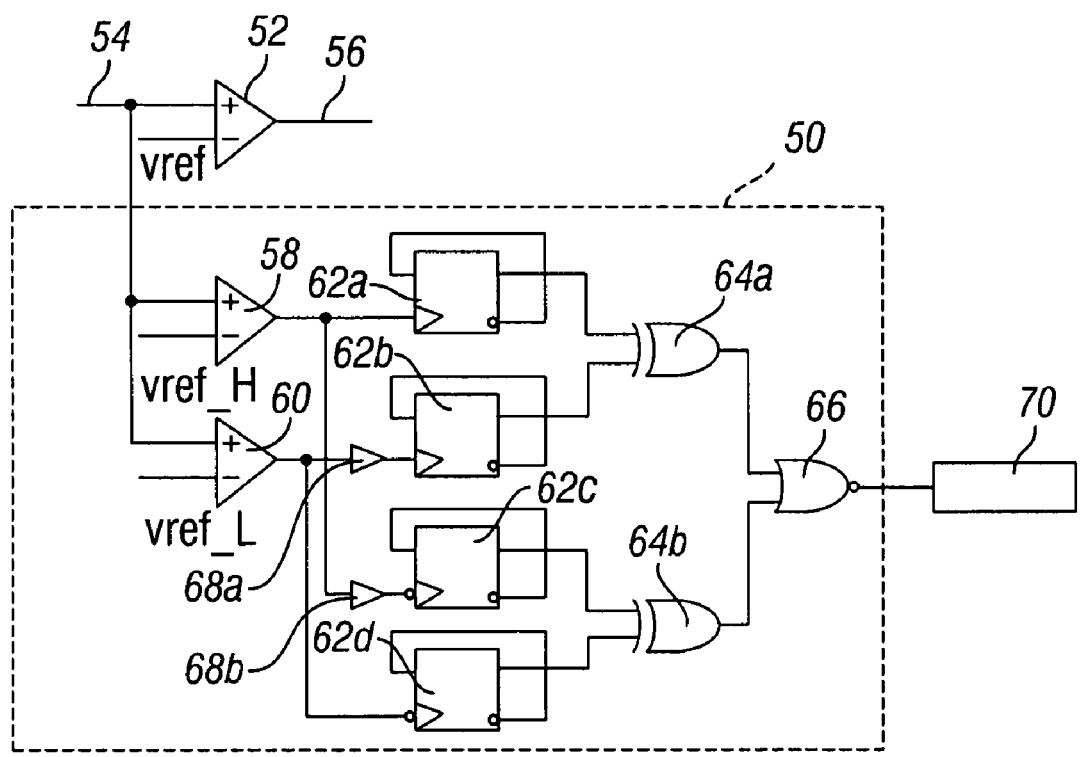
FIG. 2 shows a schematic of one embodiment of a noise margin self-diagnostic receiver circuit.

FIG. 2 shows a schematic of one embodiment of noise margin self-diagnostic receiver circuit. The receiver includes a data signal comparator 52 and a noise margin self-diagnostic circuit 50. The data comparator 52 receives a data input 54 and generates an output 56 with respect to a predetermined reference voltage (VREF) for the signal. The self-diagnostic circuit 50 includes: two additional comparators 58, 60; two delay buffers 68a, 68b; four "flip-flop" circuits 62a–62d; two "exclusive or"(XOR) logic gates 64a, 64b; a "not or" (NOR) logic gate; and a flag output 70.

In this embodiment, the data comparator 52 is a normal single ended data receiver. The comparator 52 itself may be a differential amplifier or a sense amplifier. The output of the comparator 52 is determined by whether the voltage of the data input signal 54 is higher or lower than the VREF. The comparison is made within an offset range. In some embodiments, the offset range may be ±30 mV. The other comparators 58, 60 function in the same manner, with the same physical characteristics as the data comparator with the exception of their reference voltage. The high comparator (COMP_H) 58 references the data input signal 54 to a pre-determined high voltage limit (VREF_H). Conversely, the low comparator (COMP_L) 60 references the data input signal 54 to a predetermined low voltage limit (VREF_L).

The output from each comparator feeds into the clock inputs of two separate flip-flop circuits 62a–62d. Specifically in the embodiment shown, the output of COMP_H 58 feeds into the clock input of first flip-flop 62a and the clock input of the third flip-flop 62c. The output of COMP_H 58 first passes through a delay buffer 68b before being input into the third flip-flop 62c. The output of COMP_L 60 feeds into the clock input of second flip-flop 62b and the clock input of the fourth flip-flop 62d. The output of COMP_L 60 first passes through a delay buffer 68a before being input into the second flip-flop 62b. In summary, the outputs of COMP_H 58 and COMP_L 60 provide the clock signal for the flip-flops 62a–62d.

In this embodiment, each flip-flop 62a–62d has an initial data bit value of "0". This is accomplished by use of a "power on reset" for each flip-flop 62a–62d which automatically resets the data value to "0" when the circuit 50 is powered up. Upon receipt of a clock signal from COMP_H 58 or COMP_L 60, each flip-flop 62a–62d will output a "1" to one of the XOR gates 64a, 64b. The output of these gates is then input into the NOR gate 66 and displayed as a flag on the alarm output 70. The value of the flag will then indicate if signal performance is normal or if a noise error has occurred.

As shown in FIG. 1A, a normal signal with a digital LOW value will monotonously cross over VREF_L first, then VREF, and finally VREF_H before reaching a digital HIGH value. Conversely, a normal signal with a digital HIGH value with monotonously cross over VREF_H first, then VREF, and finally VREF_L before reaching a digital LOW value. In some embodiments of the present invention, the difference between the high voltage limit and the low voltage limit is 300 mV.

As shown in FIG. 2, the circuit 50 may be broken down into two separate sections: a high-to-low section and a low-to-high section. Each section measures one of the transitions of the signal voltage and tests for errors in the transition. The high-to-low section includes the flip-flop 62a, the flip-flop 62b with delay buffer 68a and an XOR gate 64a. This section measures the transition of a signal voltage as it decreases in value through VREF_H, VREF, and VREF_L, respectively. The delay buffer 68a serves to delay the input from CMP_L 60 to flip-flop 62b in order to prevent an error from too large a transition signal being received.

Conversely, the low-to-high section includes the flip-flop 62c, the flip-flop 62d with delay buffer 68b and an XOR gate 64b. This section measures the transition of a signal voltage as it increases in value through VREF_L, VREF, and VREF_H, respectively. The delay buffer 68b serves to delay the input from CMP_H 58 to flip-flop 62c in order to prevent an error from too large a transition signal being received.

During a signal transition, CMP_H 58 and CMP_L 60 will check the nature of the monotonous signal transition against the pre-set voltage boundaries of VREF_H and VREF_L, respectively. If the transition is normal as shown in FIG. 1A, the decision logic of the circuit 50 will drive the value of the flag output to indicate a normal state at the alarm output 70. However, if the transition is in error due to voltage ring back, abnormal voltage levels, etc., the decision logic of the circuit 50 will drive the value of the flag output to indicate an error state at the alarm output 70.

The advantages of the disclosed invention includes the ability of a digital circuit to perform a self-diagnosis of signal noise error without pin-by-pin or other time intensive debugging methods. Another advantage of the disclosed invention includes the ability for the circuit to perform self-diagnosis of signal noise error in the test lab, at production quality control, or during actual usage.

While the invention has been disclosed with reference to specific examples of embodiments, numerous variations and modifications are possible. Therefore, it is intended that the invention not be limited by the description in the specification, but rather the claims that follow.

What is claimed is:

1. An apparatus for detecting a noise error of a signal comprising:
   a high comparator that references a high voltage limit with the signal and generates an output;
   a low comparator that references a low voltage limit with the signal and generates an output; and
   a circuit that processes the high comparator output and the low comparator output, wherein both the high comparator output and the low comparator output directly clock the circuit, wherein at least one of the output from the high comparator and the output from the low comparator is operatively connected to a clock input of a logic device, and wherein the circuit generates an alarm if a noise error is detected.

2. The apparatus of claim 1, wherein the circuit comprises:
   a high-to-low sub-circuit that detects a noise error during a rising signal transition; and
   a low-to-high sub-circuit that detects a noise error during a falling signal transition.

3. The apparatus of claim 2, wherein the high-to-low sub-circuit and the low-to-high sub-circuit each comprise:
   a plurality of flip-flop circuits;
   a delay buffer; and
   an XOR logic gate.

4. The apparatus of claim 1, wherein the high comparator and the low comparator each comprise a differential amplifier.

5. The apparatus of claim 1, wherein the high comparator and the low comparator each comprise a sense amplifier.

6. The apparatus of claim 1, wherein the difference between the high voltage limit and the low voltage limit is substantially 30 mV.

7. The apparatus of claim 1, wherein a noise error is caused by at least one selected from a ground glitch, a power glitch, voltage ring back, an abnormal voltage level, and a high resistance path.

8. An apparatus for detecting a noise error of a signal comprising:
   a high comparator that references a high voltage limit with the signal and generates an output;
   a low comparator that references a low voltage limit with the signal and generates an output, wherein the difference between the high voltage limit and the low voltage limit is substantially 30 mV;
   a high-to-low sub-circuit that detects a noise error during a rising signal transition, wherein the high-to-low sub-circuit comprises,
      a plurality of flip-flop circuits clocked by both the output of the high comparator and the output of the low comparator;
      a delay buffer; and
      an XOR logic gate;
   a low-to-high sub-circuit that detects a noise error during a falling signal transition, wherein the low-to-high sub-circuit comprises,
      a plurality of flip-flop circuits clocked by both the output of the high comparator and the output of the low comparator;
      a delay buffer; and
      an XOR logic gate; and
   wherein at least one of the high-to-low sub-circuit and the low-to-high sub-circuit generates an alarm if a noise error is detected.

9. A method for detecting a noise error of a signal comprising:
- comparing a high signal voltage with a high voltage limit and generating a first signal dependent thereon;
- activating an alarm if the high signal voltage is less than the high voltage limit, wherein the activating is dependent on being clocked by the first signal;
- comparing a low signal voltage with a low voltage limit and generating a second signal dependent thereon; and
- activating an alarm if the low signal voltage is greater than the low voltage limit, wherein the activating is dependent on being clocked by the second signal,
- wherein at least one of the first signal and the second signal is operatively connected to a clock input of a logic device.

10. The method of claim 9, wherein the difference between the high voltage limit and the low voltage limit is substantially 30 mV.

11. The method of claim 9, wherein the low signal voltage is compared with the low voltage limit by a low-to-high sub-circuit that detects the noise error during a falling signal transition, wherein the low-to-high sub-circuit comprises,
- a plurality of flip-flop circuits;
- a delay buffer; and
- an XOR logic gate.

12. The method of claim 9, wherein the high signal voltage is compared with the high voltage limit by a high-to-low sub-circuit that detects the noise error during a falling signal transition, wherein the low-to-high sub-circuit comprises, a plurality of flip-flop circuits;
- a delay buffer; and
- an XOR logic gate.

13. A method for detecting a noise error of a signal comprising:
- comparing a high signal voltage with a high voltage limit using a high-to-low sub-circuit that detects the noise error during a falling signal transition, wherein the high-to-low sub-circuit comprises,
  - a plurality of flip-flop circuits clocked by a signal generated dependent on the comparing,
  - a delay buffer, and
  - an XOR logic gate;
- activating an alarm if the high signal voltage is less than the high voltage limit;
- comparing a low signal voltage with a low voltage limit using a low-to-high sub-circuit that detects the noise error during a falling signal transition, wherein the low-to-high sub-circuit comprises,
  - a plurality of flip-flop circuits clocked by a signal generated dependent on the comparing,
  - a delay buffer, and
  - an XOR logic gate; and
- activating an alarm if the low signal voltage is greater than the low voltage limit.

* * * * *

UNITED STATES PATENT AND TRADEMARK OFFICE
CERTIFICATE OF CORRECTION

| | |
|---|---|
| PATENT NO. | : 7,130,340 B1 |
| APPLICATION NO. | : 09/698622 |
| DATED | : October 31, 2006 |
| INVENTOR(S) | : Jyh-Ming Jong et al. |

Page 1 of 1

It is certified that error appears in the above-identified patent and that said Letters Patent is hereby corrected as shown below:

On the title page

Under item (56) References Cited, U.S. PATENT DOCUMENTS, add

--4,796,208  1/1989  McGinn--.

Under item (56) References Cited, U.S. PATENT DOCUMENTS, add

--6,313,686  11/2001  Kamiya--.

Signed and Sealed this

Sixth Day of February, 2007

JON W. DUDAS
*Director of the United States Patent and Trademark Office*